(12) United States Patent
Ohzu

(10) Patent No.: US 11,349,361 B2
(45) Date of Patent: May 31, 2022

(54) ROTOR CORE

(71) Applicant: HONDA MOTOR CO., LTD., Tokyo (JP)

(72) Inventor: Tatsuya Ohzu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 16/597,261

(22) Filed: Oct. 9, 2019

(65) Prior Publication Data

US 2020/0119607 A1 Apr. 16, 2020

(30) Foreign Application Priority Data

Oct. 10, 2018 (JP) .............................. JP2018-192066

(51) Int. Cl.
*H02K 1/32* (2006.01)
*H02K 1/27* (2022.01)
*H02K 1/276* (2022.01)

(52) U.S. Cl.
CPC .............. *H02K 1/32* (2013.01); *H02K 1/276* (2013.01)

(58) Field of Classification Search
CPC ........ H02K 1/276; H02K 1/32; H02K 1/2766; H02K 2213/03
USPC ......................................................... 310/61
See application file for complete search history.

(56) References Cited

U.S. PATENT DOCUMENTS

| | | | | |
|---|---|---|---|---|
| 2012/0049686 A1* | 3/2012 | Mizuike | ................... | H02K 1/28 310/156.53 |
| 2012/0104891 A1* | 5/2012 | Yamaguchi | ............ | H02K 1/276 310/156.53 |
| 2012/0256516 A1 | 10/2012 | Matsushita et al. | | |
| 2014/0070642 A1* | 3/2014 | Lang | ....................... | G06F 30/23 310/59 |
| 2014/0225470 A1 | 8/2014 | Yamaguchi et al. | | |

(Continued)

FOREIGN PATENT DOCUMENTS

| | | |
|---|---|---|
| JP | 2009-011011 A | 1/2009 |
| JP | 2013-183481 A | 9/2013 |

(Continued)

OTHER PUBLICATIONS

Aug. 11, 2020, Japanese Office Action issued for related JP application No. 2018-192066.

*Primary Examiner* — Alex W Mok

(74) *Attorney, Agent, or Firm* — Paratus Law Group, PLLC

(57) ABSTRACT

A rotor core which includes: a first hole portion group; and a second hole portion group. Each hole portion of the second hole portion group is arranged to intersect with a virtual extension line of a rib formed between the adjacent hole portions of the first hole portion group, and includes: a first and second end portions; an outer radial side apex portion; and an outer peripheral wall. The outer radial side apex portion is located at an intersection point between a virtual line which is orthogonal to a virtual line connecting the center of the rotor core and the first end portion and passes through the first end portion and a virtual line which is orthogonal to a virtual line connecting the center of the rotor core and the second end portion and passes through the second end portion or is located radially outward of the intersection point.

8 Claims, 11 Drawing Sheets

(56) References Cited

U.S. PATENT DOCUMENTS

| | | | |
|---|---|---|---|
| 2014/0225471 A1* | 8/2014 | Kawanami | H02K 1/274 310/156.53 |
| 2014/0232232 A1* | 8/2014 | Yamaguchi | H02K 1/2766 310/156.53 |
| 2015/0061443 A1* | 3/2015 | Tanaka | H02K 1/276 310/156.08 |
| 2016/0301269 A1* | 10/2016 | Yamaguchi | H02K 1/2766 |

FOREIGN PATENT DOCUMENTS

| | | |
|---|---|---|
| JP | 2014-158331 A | 8/2014 |
| JP | 2016-032340 A | 3/2016 |
| JP | 2017-184343 A | 10/2017 |
| WO | WO 2011/077522 A1 | 6/2011 |

* cited by examiner

ROTOR CORE

CROSS-REFERENCE TO RELATED APPLICATIONS

The present application claims the benefit of priority of Japanese Patent Application No. 2018-192066, filed on Oct. 10, 2018, the content of which is incorporated herein by reference.

TECHNICAL FIELD

The present invention relates to a rotor core which constitutes a rotor of a motor.

BACKGROUND ART

WO 2011/077522 discloses a rotor core which includes a rotor shaft hole into which a rotor shaft is tightened, a first hole portion group provided on an outer side of the rotor shaft hole in a radial direction and having a plurality of hole portions arranged in a circumferential direction, a shaft holding portion provided between the rotor shaft hole and the first hole portion group in the radial direction, a second hole portion group provided on an outer side of the first hole portion group in the radial direction and having a plurality of hole portions arranged in the circumferential direction, a first annular portion provided between the first hole portion group and the second hole portion group in the radial direction, and an electromagnetic portion provided on an outer side of the second hole portion group in the radial direction and having a plurality of magnet insertion holes into which magnets are respectively inserted.

In this type of rotor core, the first hole portion group, the second hole portion group, and the first annular portion function as regions for absorbing the centrifugal force of the rotor core. Further, in the rotor core described in WO 2011/077522, each hole portion of the second hole portion group is disposed so as to intersect with a virtual extension line of a rib formed between adjacent hole portions of the first hole portion group. Therefore, the centrifugal force can be absorbed by the hole portions of the second hole portion group, and thus the transfer of the centrifugal force to the shaft holding portion through the rib can be reduced.

However, in the rotor core disclosed in WO/2011/077522, when the centrifugal force acts on each hole portion of the second hole portion group, a large bending stress is generated in the region around a circumferential end portion on an outer circumferential side of the hole portion of the second hole portion group, and thus stress concentration occurs.

SUMMARY

The invention provides a rotor core capable of alleviating stress concentration by suppressing a bending stress generated in a hole portion by a centrifugal force.

According to an aspect of the invention, there is provided a rotor core including: a rotor shaft hole into which a rotor shaft is tightened; a first hole portion group provided on an outer side of the rotor shaft hole in a radial direction and having a plurality of hole portions arranged in a circumferential direction; a shaft holding portion provided between the rotor shaft hole and the first hole portion group in the radial direction; a second hole portion group provided on an outer side of the first hole portion group in the radial direction and having a plurality of hole portions arranged in the circumferential direction; a first annular portion provided between the first hole portion group and the second hole portion group in the radial direction; and an electromagnetic portion provided on an outer side of the second hole portion group in the radial direction and having a plurality of magnet insertion holes into which magnets are respectively inserted, wherein: each hole portion of the second hole portion group is arranged to intersect with a virtual extension line of a rib formed between the adjacent hole portions of the first hole portion group; each hole portion of the second hole portion group includes: a first end portion and a second end portion forming both circumferential end portions; an outer radial side apex portion having a radial distance from a center of the rotor core longer than that of the first end portion and the second end portion and forming a radially outer apex portion; and an outer peripheral wall having a first outer peripheral wall extending from the first end portion to the outer radial side apex portion and a second outer peripheral wall extending from the second end portion to the outer radial side apex portion; and the outer radial side apex portion is located at an intersection point between a virtual line which is orthogonal to a virtual line connecting the center of the rotor core and the first end portion and passes through the first end portion and a virtual line which is orthogonal to a virtual line connecting the center of the rotor core and the second end portion and passes through the second end portion or is located radially outward of the intersection point.

Effects

According to the invention, the stress concentration can be alleviated by suppressing the bending stress generated in the hole portion due to the centrifugal force.

DESCRIPTION OF EMBODIMENTS

Hereinafter, embodiments of the invention will be described based on the accompanying drawings. The drawings are viewed in the direction of the reference signs.

First Embodiment

First, a rotor core according to a first embodiment of the invention will be described with reference to FIGS. 1 to 6.

Rotor Core

A rotor core 1 is configured by laminating a plurality of electromagnetic steel plates in an axial direction of a rotor shaft 2 and constitutes a rotor of a motor together with the rotor shaft 2 and a plurality of magnets 3 assembled to the rotor core 1.

Figure 1:
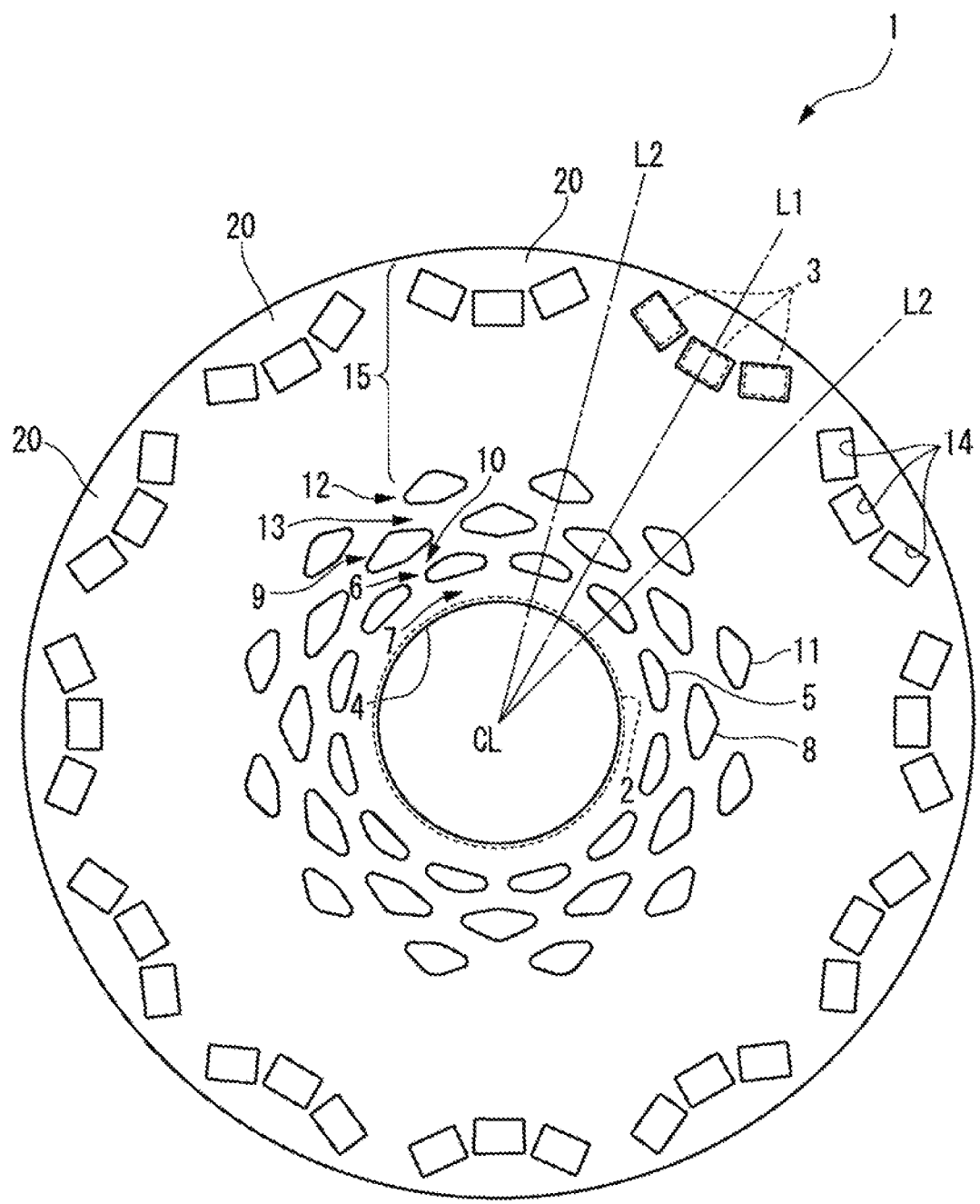
FIG. 1 is a front view of a rotor core according to a first embodiment of the invention.

As illustrated in FIG. 1, the rotor core 1 has an annular shape in which a rotor shaft hole 4 into which the rotor shaft 2 is tightened by press-fitting is provided at a center CL. The rotor core 1 includes a first hole potion group 6 having a plurality of hole portions 5 provided on the outer side of the rotor shaft 4 in a radial direction and arranged in a circumferential direction and a shaft holding portion 7 provided between the rotor shaft hole 4 and the first hole portion group 6 in the radial direction. Further, the rotor core 1 includes a second hole potion group 9 having a plurality of hole portions 8 provided on the outer side of the first hole portion group 6 in the radial direction and arranged in the circumferential direction and a first annular portion 10 provided between the first hole portion group 6 and the second hole portion group 9 in the radial direction. Further, the rotor core 1 includes a third hole potion group 12 having a plurality of hole portions 11 provided on the outer side of the second hole portion group 9 in the radial direction and arranged in the circumferential direction and a second annular portion 13 provided between the second hole portion group 9 and the third hole portion group 12 in the radial direction. In addition, the rotor core 1 includes an electromagnetic portion 15 provided on an outer side of the third hole portion group 12 in the radial direction and having a plurality of magnet insertion holes 14 into which the magnets 3 are respectively inserted.

The magnet 3 is, for example, a permanent magnet such as a neodymium magnet. In the embodiment, one magnet pole portion 20 is configured by three magnets 3 arranged in three magnet insertion holes 14 arranged in a substantially arc shape which protrudes inward in the radial direction of the rotor core 1.

The first hole portion group 6, the second hole portion group 9, and the third hole portion group 12, and the first annular portion 10 and the second annular portion 13 formed by those hole portion groups 6, 9, and 12 function as regions for absorbing the centrifugal force due to rotation of the rotor and the tightening load of the rotor shaft 2.

Arrangement of Hole Portions

Figure 2:
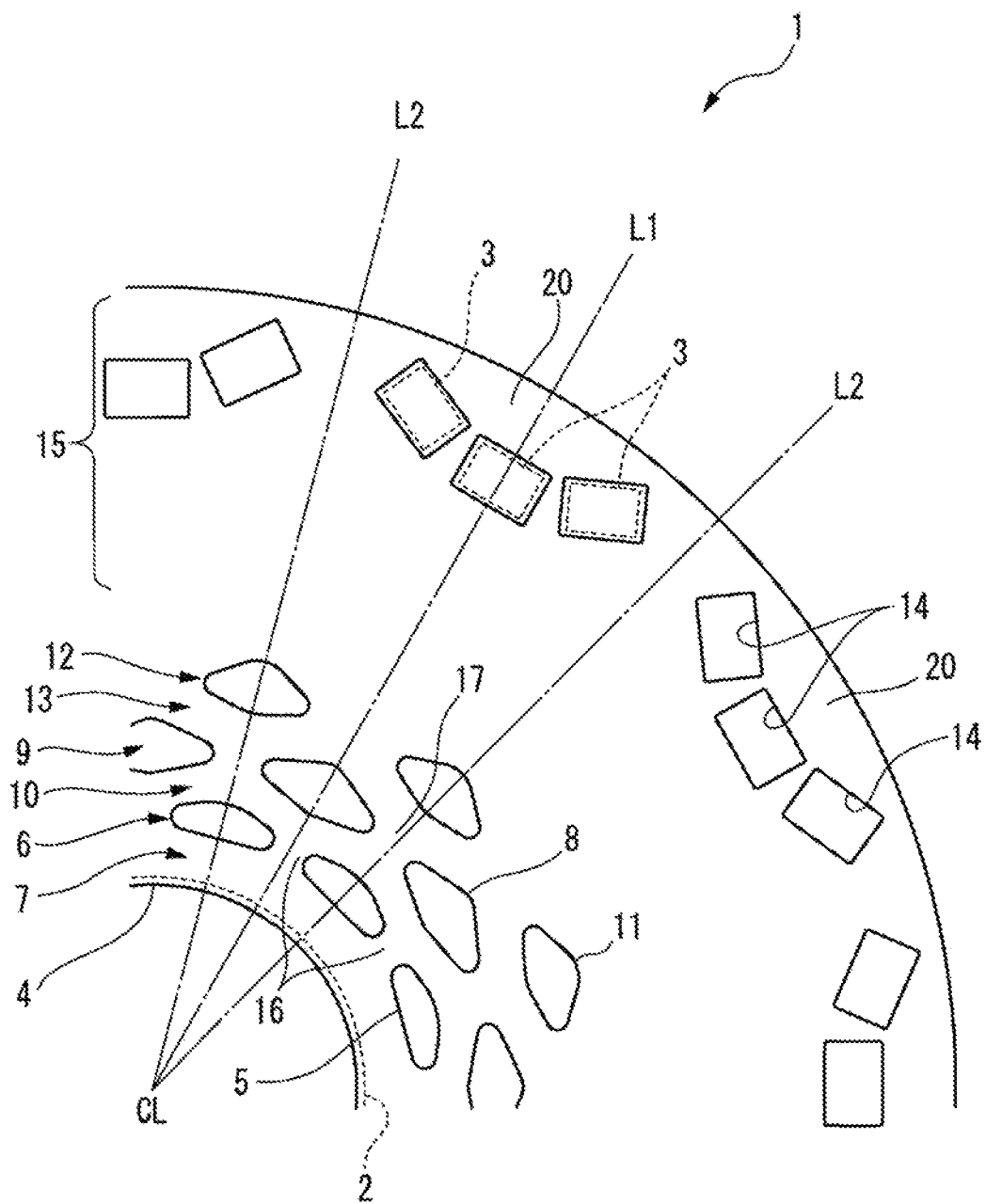
FIG. 2 is a partially enlarged view of FIG. 1.

As illustrated in FIG. 2, a rib 16 is formed between adjacent hole portions 5 of the first hole portion group 6. Each hole portion 8 of the second hole portion group 9 is arranged to intersect with a virtual line L1, which is a virtual extension line of the rib 16 passing through the center CL of the rotor core 1 and a circumferential center position of the rib 16. That is, the hole portions 5 of the first hole portion group 6 and the hole portions 8 of the second hole portion group 9 are alternately arranged in the circumferential direction. As a result, the centrifugal force can be absorbed by the hole portions 8 of the second hole portion group 9 and the transfer of the centrifugal force to the rib 16 can be suppressed.

Each hole portion 8 of the second hole portion group 9 of the embodiment is disposed so that the circumferential center position is on the virtual line L1. Furthermore, each hole portion 8 of the second hole portion group 9 has a circumferential length longer than that of the rib 16 and circumferentially overlaps both of the adjacent hole portions 5 with the rib 16 interposed therebetween.

Further, in the embodiment, the virtual line L1 is a line passing through the center CL of the rotor core 1 and the circumferential center position of the rib 16 and a line passing through the center CL of the rotor core 1 and the circumferential center portion of each magnet pole portion 20. That is, the virtual line L1 coincides with a d axis which is a central axis of the magnet pole portion 20.

A rib 17 is formed between adjacent hole portions 8 of the second hole portion group 9. Each hole portion 11 of the third hole portion group 12 is arranged to intersect with a virtual line L2, which is a virtual extension line of the rib 17 passing through the center CL of the rotor core 1 and the circumferential center position of the rib 17. That is, the hole portions 8 of the second hole portion group 9 and the hole portions 11 of the third hole portion group 12 are alternately arranged in the circumferential direction. As a result, the centrifugal force can be absorbed by the hole portions 11 of the third hole portion group 12 and the transfer of the centrifugal force to the rib 17 can be suppressed.

Each hole portion 11 of the third hole portion group 12 of the embodiment is disposed so that the circumferential center position is on the virtual line L2. Furthermore, each hole portion 11 of the third hole portion group 12 of the rotor core 1 has a circumferential length longer than that of the rib 17 and circumferentially overlaps both of the adjacent hole portions 8 with the rib 17 interposed therebetween.

Further, in the embodiment, the virtual line L2 is a line passing through the center CL of the rotor core 1 and the circumferential center position of the rib 17 and a line passing through the center CL of the rotor core 1 and one circumferential end portion or the other circumferential end portion of each magnet pole portion 20. That is, the virtual line L2 coincides with a q axis separated by 90 degrees in electrical angle with respect to the d axis.

The plurality of hole portions 5 of the first hole portion group 6, the plurality of hole portions 8 of the second hole portion group 9, and the plurality of hole portions 11 of the third hole portion group 12 are arranged at equal intervals in the circumferential direction. Therefore, respective hole portion groups 6, 9, and 12 can receive the centrifugal force equally over the whole circumferential direction.

Shape of Hole Portion

Figure 3A:
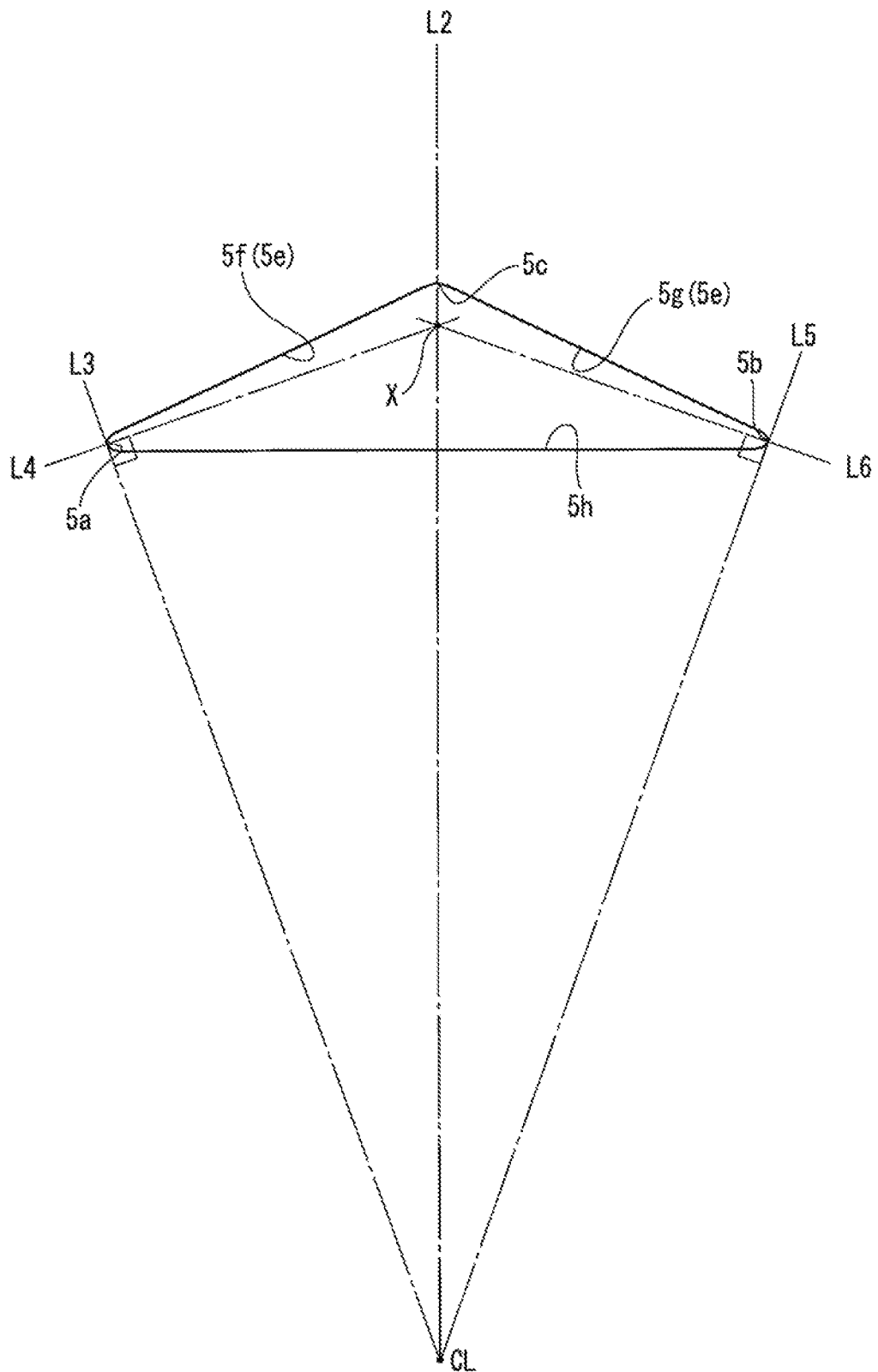
FIG. 3A is an enlarged view of a hole portion of a first hole portion group.

As illustrated in FIG. 3A, each hole portion 5 of the first hole portion group 6 has a substantially triangular shape convex outward in the radial direction. The hole portion 5 of the first hole portion group 6 has a first end portion 5a and a second end portion 5b which form both circumferential end portions and an outer radial side apex portion 5c which has a radial distance from the center CL of the rotor core 1 longer than that of the first end portion 5a and the second end portion 5b and forms an apex portion on the radial outer side. Furthermore, the hole portion 5 of the first hole portion group 6 includes an outer peripheral wall 5e which has a first outer peripheral wall 5f extending substantially linearly from the first end portion 5a to the outer radial side apex portion 5c and a second outer peripheral wall 5g extending substantially linearly from the second end portion 5b to the outer radial side apex portion 5c. Further, the hole portion 5 of the first hole portion group 6 includes an inner peripheral wall 5h which is substantially orthogonal to the virtual line L2 and extends substantially linearly from the first end portion 5a to the second end portion 5b.

Therefore, each hole portion 5 of the first hole portion group 6 can reduce the centrifugal force transmitted inward in the radial direction of the rotor core 1 by deformation of the outer radial side apex portion 5c with respect to the centrifugal force. Therefore, it is possible to suppress the widening of the rotor shaft hole 4 due to the centrifugal force and to suppress the reduction of the interference due to the widening of the rotor shaft hole 4.

Furthermore, since, in the hole portion 5 of the first hole portion group 6, the inner peripheral wall 5h has a substantially straight line shape substantially orthogonal to the virtual line L2, a force acting on the inner peripheral wall 5h when the centrifugal force acts on the outer radial side apex portion 5c of the hole portion 5 has substantially no radial component at the circumferentially central portion of the inner peripheral wall 5h. Therefore, since the deformation of the shaft holding portion 7 can be reduced, it is possible to suppress the widening of the rotor shaft hole 4 due to the centrifugal force and to suppress the reduction of the interference due to the widening of the rotor shaft hole 4.

The hole portion 5 of the first hole portion group 6 has an outer radial side apex portion 5c located on the virtual line L2 and has a symmetrical shape with respect to the virtual line L2.

The outer radial side apex portion 5c of the hole portion 5 of the first hole portion group 6 is located at an intersection point X between a virtual line L4 which is orthogonal to a virtual line L3 connecting the center CL of the rotor core 1 and the first end portion 5a and passes through the first end portion 5a and a virtual line L6 which is orthogonal to a virtual line L5 connecting the center CL of the rotor core 1 and the second end portion 5b and passes through the second end portion 5b, or is located radially outward of the intersection point X. In the embodiment, the outer radial side apex portion 5c of the hole portion 5 of the first hole portion group 6 is located radially outward of the intersection point X.

Figure 3B:
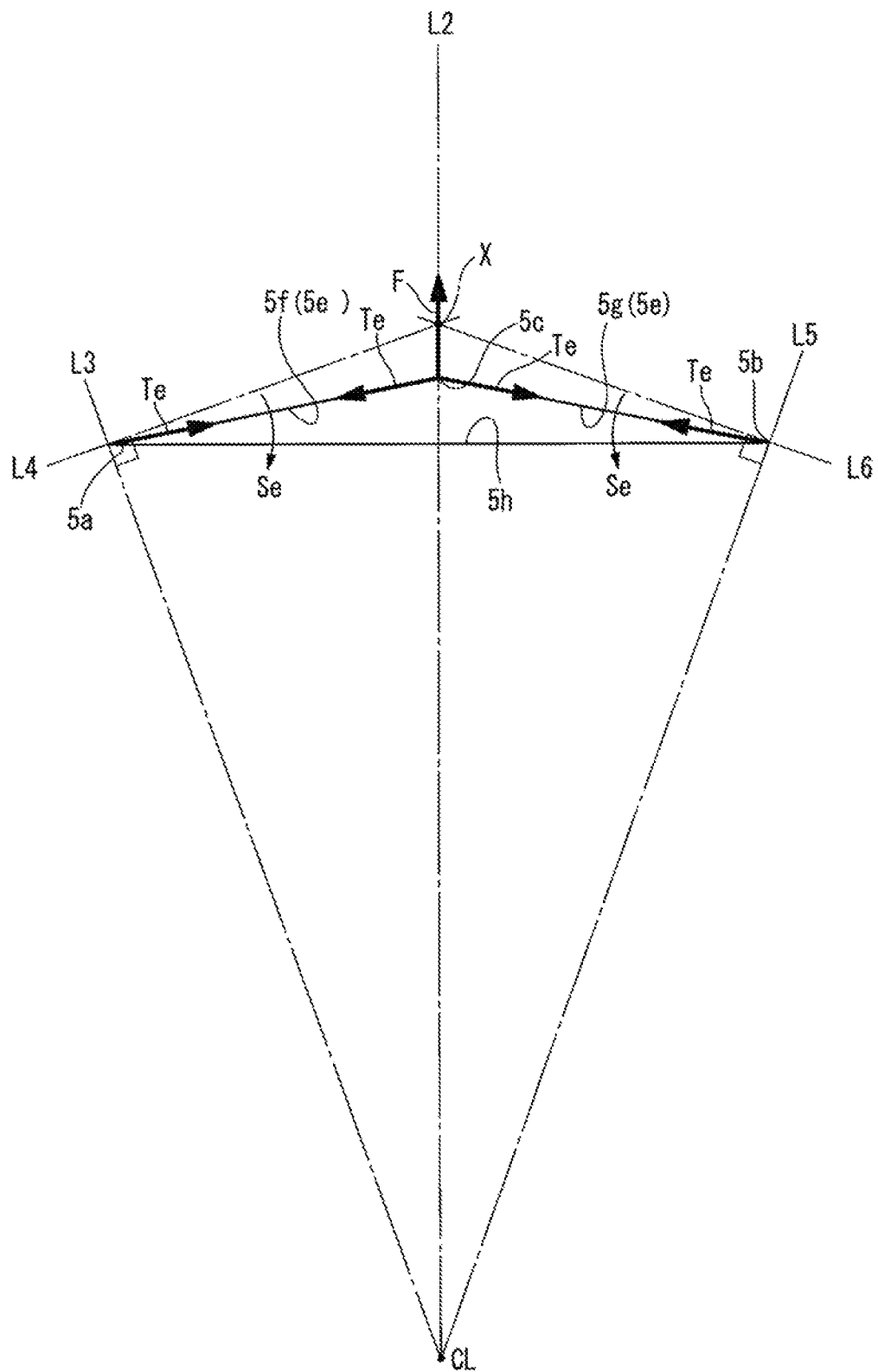
FIG. 3B is a view illustrating a force acting when an outer diameter side apex portion of the first hole portion group is located on an inner side than an intersection point X.

As illustrated in FIG. 3B, when the outer radial side apex portion 5c is positioned radially inward of the intersection point X and centrifugal force F acts on the outer radial side apex portion 5c, a bending stress Se in the radially inward direction is generated in the outer peripheral wall 5e in addition to a tension Te. Therefore, in the region around the first end portion 5a and the second end portion 5b of the outer peripheral wall 5e, the bending moment becomes large and the bending stress is concentrated.

Figure 3C:
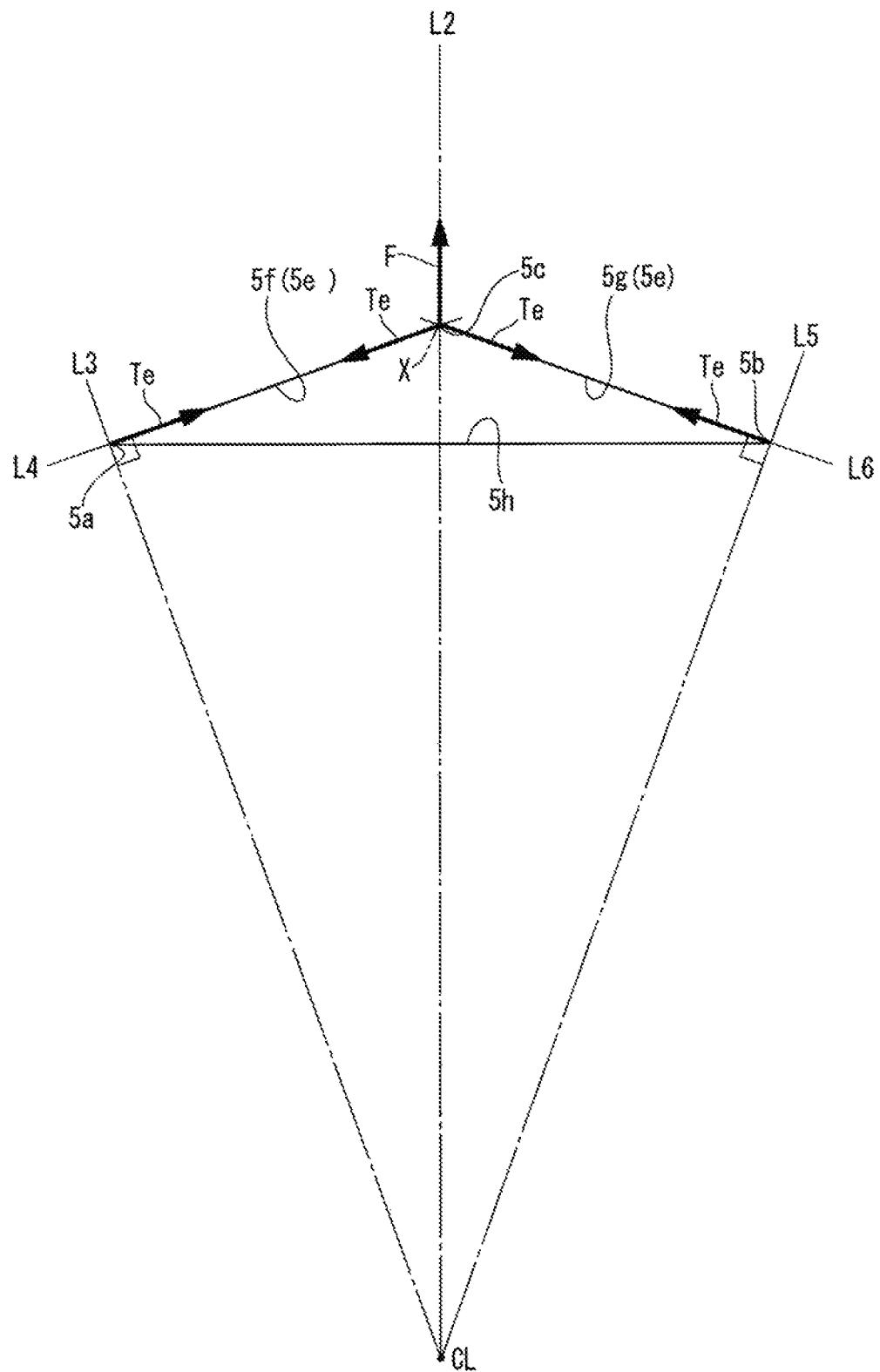
FIG. 3C is a view illustrating a force acting when the outer diameter side apex portion of the first hole portion group is located at the intersection point X.

On the other hand, as illustrated in FIG. 3C, since, when the outer radial side apex portion 5c is located at the intersection point X, the first outer peripheral wall 5f is along the virtual line L4 and the second outer peripheral wall 5g is along the virtual line L6, even when the centrifugal force F acts on the outer radial side apex portion 5c, almost no bending stress occurs in the outer peripheral wall 5e. Therefore, stress concentration in the region around the first end portion 5a and the second end portion 5b of the outer peripheral wall 5e can be alleviated.

Figure 3D:
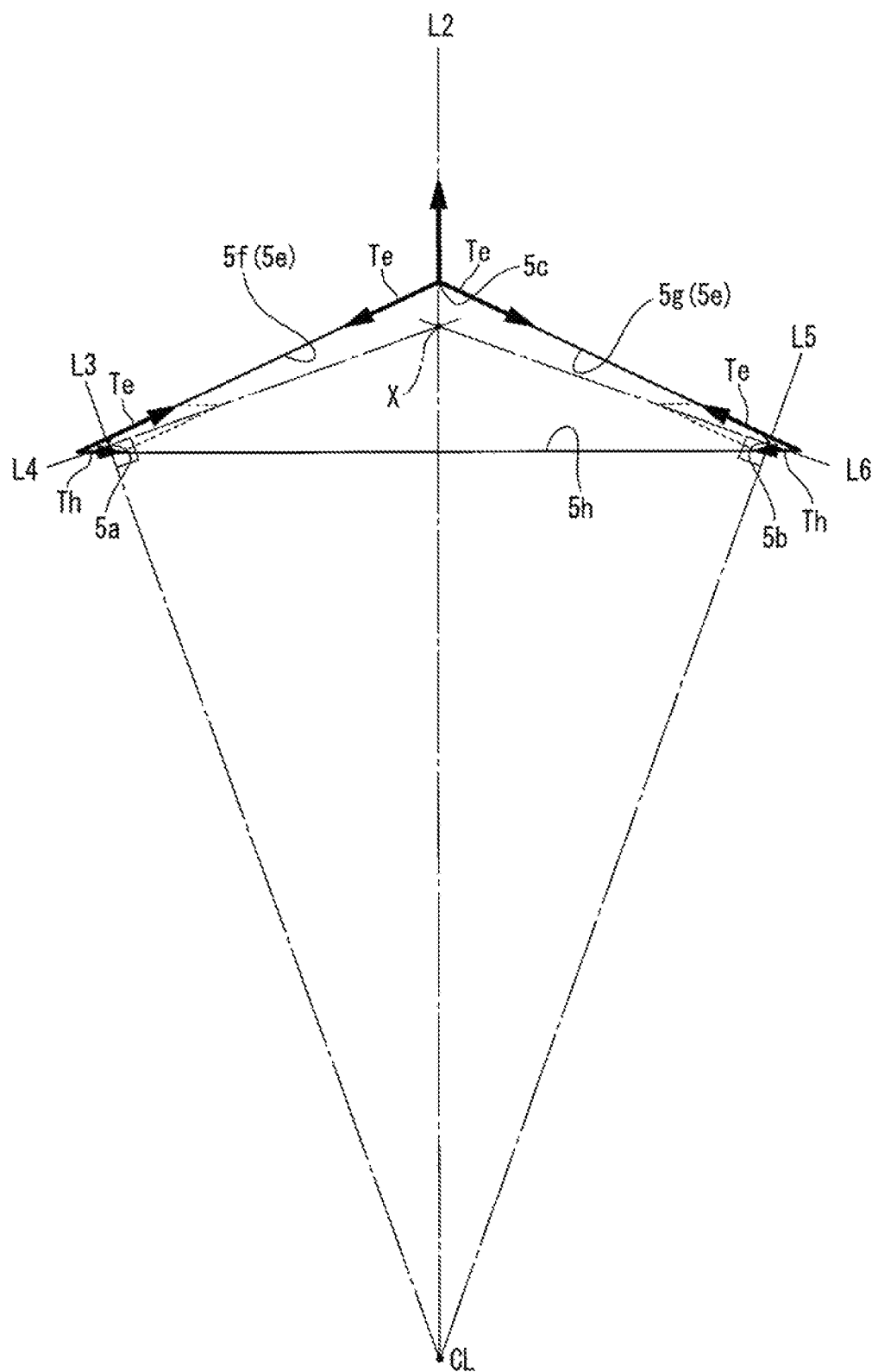
FIG. 3D is a view illustrating a force acting when the outer diameter side apex portion of the first hole portion group is located on an outer side than the intersection point X.

Also, as illustrated in FIG. 3D, when the outer radial side apex portion 5c is positioned radially outward of the intersection point X, gaps are formed in a portion between the outer peripheral wall 5e and the virtual line L4 from the first end portion 5a to the intersection point X and a portion between the outer peripheral wall 5e and the virtual line L6 from the second end portion 5b to the intersection point X.

Therefore, when the centrifugal force F acts on the outer radial side apex portion 5c, in addition to the tension being generated in the outer peripheral wall 5e, the tension Th is generated in the inner peripheral wall 5h. Thus, the stress generated in the hole portion 5 by the centrifugal force F acting on the outer radial side apex portion 5c is dispersed to the outer peripheral wall 5e and the inner peripheral wall 5h. As a result, the bending stress generated in the outer peripheral wall 5e can be reduced and the stress concentration in the region around the first end portion 5a and the second end portion 5b of the outer peripheral wall 5e can be alleviated.

As described above, the outer radial side apex portion 5c of the hole portion 5 of the first hole portion group 6 is located at the intersection point X between the virtual line L4 and the virtual line L6 or is located radially outward of the intersection point X. Thus, since it is possible to reduce the bending stress generated in the first outer peripheral wall 5f and the second outer peripheral wall 5g when the centrifugal force is generated, stress concentration in the region around the first end portion 5a and the second end portion 5b of the outer peripheral wall 5e by the centrifugal force can be alleviated.

Since, in the hole portion 5 of the first hole portion group 6, the inner peripheral wall 5h has a substantially linear shape, a force acting on the inner peripheral wall 5h when the centrifugal force acts on the outer radial side apex portion 5c of the hole portion 5 has almost no radial component in the circumferential central portion of the inner peripheral wall 5h. Therefore, it is possible to suppress the widening of the rotor shaft hole 4 due to the centrifugal force and to suppress the reduction of the interference due to the widening of the rotor shaft hole 4.

Figure 4A:
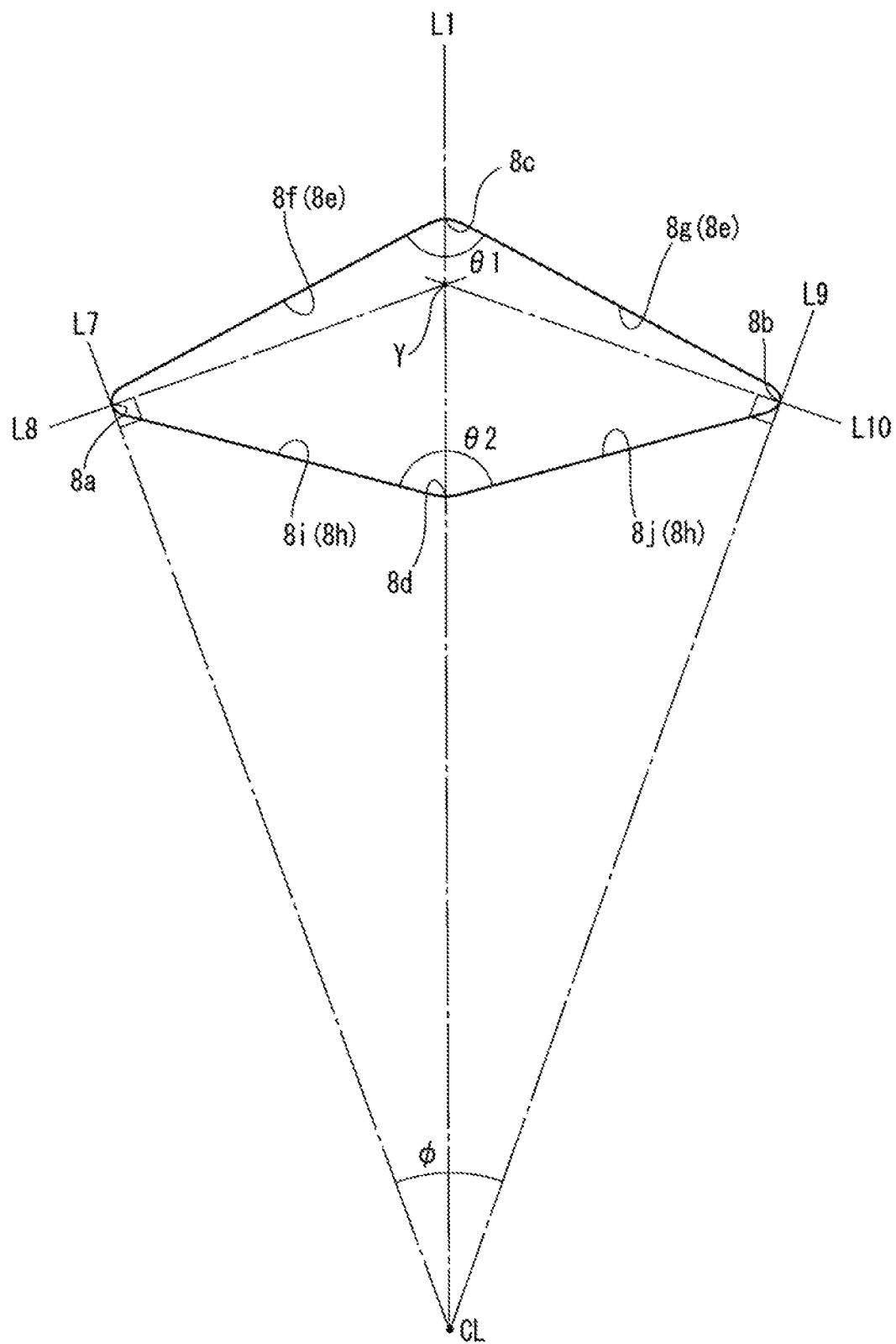
FIG. 4A is an enlarged view of a hole portion of a second hole portion group.

As illustrated in FIG. 4A, each hole portion 8 of the second hole portion group 9 has a substantially rectangular shape convex on both sides in the circumferential direction and both sides in the radial direction. Each hole portion 8 of the second hole portion group 9 has a first end portion 8a and a second end portion 8b forming both circumferential end portions, an outer radial side apex portion 8c which has a radial distance from the center CL of the rotor core 1 longer than that of the first end portion 8a and the second end portion 8b and forms a radially outer apex portion, and an inner radial side apex portion 8d which has a radial distance from the center CL of the rotor core 1 shorter than that of the first end portion 8a and the second end portion 8b and forms a radially inner apex portion. Therefore, the hole area of the hole portion 8 can be increased, and thus the weight reduction of the rotor core 1 can be achieved. In addition, stress concentration in the first end portion 8a and the second end portion 8b due to the centrifugal force and the tightening load of the rotor shaft 2 can be alleviated.

Further, the hole portion 8 of the second hole portion group 9 includes an outer peripheral wall 8e which has a first outer peripheral wall 8f extending substantially linearly from the first end portion 8a to the outer radial side apex portion 8c and a second outer peripheral wall 8g extending substantially linearly from the second end portion 8b to the outer radial side apex portion 8c. In addition, the hole portion 8 of the second hole portion group 9 includes an inner peripheral wall 8h which has a first inner peripheral wall 8i extending substantially linearly from the first end portion 8a to the inner radial side apex portion 8d and a second inner peripheral wall 8j extending substantially linearly from the second end portion 8b to the inner radial side apex portion 8d.

Each hole portion 8 of the second hole portion group 9 is deformed so that the outer radial side apex portion 8c is pulled radially outward with respect to the centrifugal force. By the deformation of the hole portion 8, the centrifugal force is absorbed in the hole portion 8. Therefore, since it is possible to suppress the centrifugal force from being transmitted to the radially inner side of the rotor core 1, it is possible to suppress the widening of the rotor shaft hole 4 due to the centrifugal force and to suppress the reduction of the interference due to the widening of the rotor shaft hole 4.

Furthermore, the hole portion 8 of the second hole portion group 9 is deformed so that the inner radial side apex portion 8*d* is pushed radially outward with respect to the tightening load of the rotor shaft 2. By the deformation of the hole portion 8, the tightening load of the rotor shaft 2 is absorbed in the hole portion 8. Therefore, since it is possible to suppress the tightening load of the rotor shaft 2 from being transmitted to the outside in the radial direction of the rotor core 1, it is possible to suppress the deformation of the outer peripheral portion of the rotor core 1 due to the tightening load of the rotor shaft 2.

In the hole portion 8 of the second hole portion group 9, the outer radial side apex portion 8*c* and the inner radial side apex portion 8*d* are located on the virtual line L1 and has a symmetrical shape with respect to the virtual line L1.

The outer radial side apex portion 8*c* of the hole portion 8 of the second hole portion group 9 is located at an intersection point Y between a virtual line L8 which is orthogonal to a virtual line L7 connecting the center CL of the rotor core 1 and the first end portion 8*a* and passes through the first end portion 8*a* and a virtual line L10 which is orthogonal to a virtual line L9 connecting the center CL of the rotor core 1 and the second end portion 8*b* and passes through the second end portion 8*b*, or is located radially outward of the intersection point Y. In the embodiment, the outer radial side apex portion 8*c* of the hole portion 8 of the second hole portion group 9 is located radially outward of the intersection point Y.

Therefore, since the hole portion 8 of the second hole portion group 9 can reduce the bending stress generated in the first outer peripheral wall 8*f* and the second outer peripheral wall 8*g* when the centrifugal force is generated, it is possible to alleviate the stress concentration in the region around the first end portion 8*a* and the second end portion 8*b* of the outer peripheral wall 8*e* due to the centrifugal force.

An angle θ1 formed by the first outer peripheral wall 8*f* and the second outer peripheral wall 8*g* of the hole portion 8 of the second hole portion group 9 and an angle θ2 formed by the first inner peripheral wall 8*i* and the second inner peripheral wall 8*j* of the hole portion 8 of the second hole portion group 9 satisfy the following equation (1), taking an angle formed by the first end portion 8*a* and the second end portion 8*b* at the center CL of the rotor core 1 as φ. Each of θ1 and θ2 is an angle larger than 0° and smaller than 180°. φ is an angle larger than 0° and smaller than 360°/(the number of magnet pole portions 20 of rotor core 1). In the embodiment, since the number of magnet pole portions 20 of the rotor core 1 is 12, φ is an angle larger than 0° and smaller than 30°.

$$\theta1+2\phi \geq \theta2 \geq \theta1 \quad (1)$$

Figure 4B:
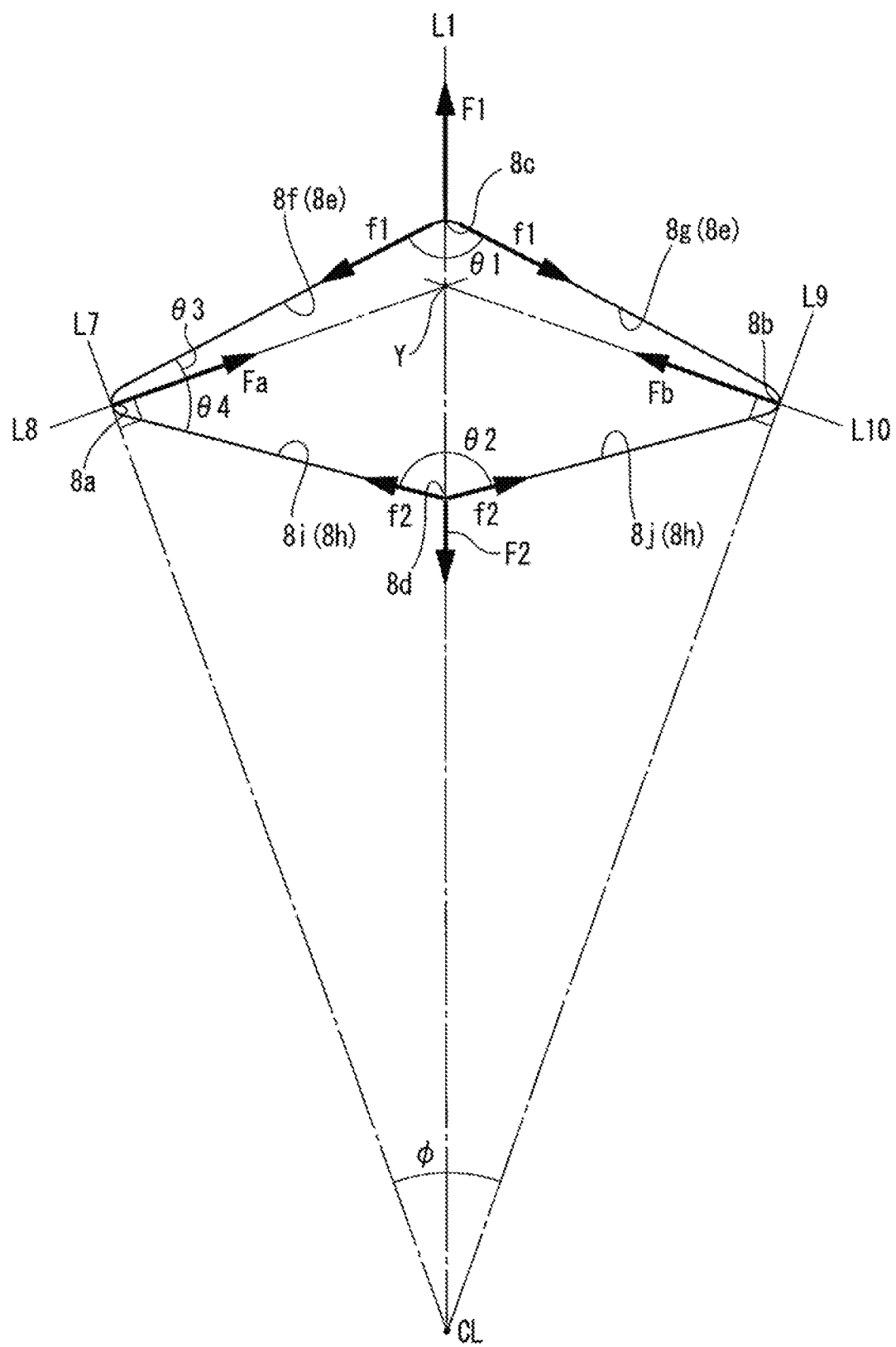
FIG. 4B is a view illustrating a force acting on the hole portion of the second hole portion group.

As illustrated in FIG. 4B, when a centrifugal force F1 acts on the outer radial side apex portion 8*c* of the hole portion 8, a force Fa acting in a direction toward the intersection point Y along the virtual line L8 is generated in the first end portion 8*a* and a force Fb acting in a direction toward the intersection point Y along the virtual line L10 is generated in the second end portion 8*b*, and further, a force F2 acting radially inward along the imaginary line L1 is generated in the inner radial side apex portion 8*d*.

Since the hole portion 8 of the second hole portion group 9 has a symmetrical shape with respect to the virtual line L1, assuming that the tension generated in the first outer peripheral wall 8*f* by the centrifugal force F1 is f1, the following equation (2) is established.

$$F1 = 2 \cdot f1 \cos(\theta1/2) \quad (2)$$

Similarly, assuming that the tension generated in the first inner peripheral wall 8*i* by the force F2 is f2, the following equation (3) is established.

$$F2 = 2 \cdot f2 \cdot \cos(\theta2/2) \quad (3)$$

Assuming that an angle formed by the first outer peripheral wall 8*f* and the virtual line L8 at the first end portion 8*a* of the hole portion 8 of the second hole portion group 9 is θ3 and an angle formed by the first inner peripheral wall 8*i* and the virtual line L8 at the first end portion 8*a* is θ4, the following equation (4) is established.

$$Fa = f1 \cdot \cos\theta3 + f2 \cdot \cos\theta4 \quad (4)$$

Further, since the force Fa acting on the first end portion 8*a* acts only in a direction toward the intersection point Y along the virtual line L8, the components orthogonal to the virtual line L8 cancel each other and the following equation (5) is established.

$$f1 \cdot \sin\theta3 = f2 \cdot \sin\theta4 \quad (5)$$

Further, since the hole portion 8 of the second hole portion group 9 has a symmetrical shape with respect to the virtual line L1, the following equations (6) and (7) are established.

$$\theta3 = 90° - (\theta1+\phi)/2 \quad (6)$$

$$\theta4 = 90° - (\theta2-\phi)/2 \quad (7)$$

From the equations (2) to (7), the following equation (8) is derived by eliminating f1, f2, θ3, θ4, and Fa.

$$F2 = F1 \cdot \frac{\cos\frac{\theta1+\phi}{2}}{\cos\frac{\theta2-\phi}{2}} \cdot \frac{\cos\frac{\theta2}{2}}{\cos\frac{\theta1}{2}} \quad (8)$$

Here, since θ1, θ2, and φ satisfy the equation (1), the following equations (9) and (10) are established.

$$\theta1+\phi \geq \theta2-\phi \quad (9)$$

$$\theta2 \geq \theta1 \quad (10)$$

Therefore, the following equations (11) and (12) are established.

$$\frac{\cos\frac{\theta1+\phi}{2}}{\cos\frac{\theta2-\phi}{2}} \leq 1 \quad (11)$$

$$\frac{\cos\frac{\theta2}{2}}{\cos\frac{\theta1}{2}} \leq 1 \quad (12)$$

Therefore, from the equations (8), (11), and (12), the centrifugal force F1 acting on the outer radial side apex portion 8c of the hole portion 8 and the force F2 acting on the inner radial side apex portion 8d by the centrifugal force F1 always satisfy F2≤F1.

That is, in the hole portion 8 of the second hole portion group 9, the force F2 acting on the inner radial side apex portion 8d by the centrifugal force F1 is always smaller than the centrifugal force F1 acting on the outer radial side apex portion 8c. As a result, since the reaction force of the force F2 acting on the inner radial side apex portion 8d is always smaller than the centrifugal force F1, it is possible to suppress the widening of the rotor shaft hole 4 due to the centrifugal force and to suppress the reduction of the interference due to the widening of the rotor shaft hole 4.

Further, in the hole portion 8 of the second hole portion group 9, the outer radial side apex portion 8c and the inner radial side apex portion 8d are located on the virtual line L1 and the hole portion 8 has a symmetrical shape with respect to the virtual line L1. Therefore, the hole portion 8 can suppress the widening of the rotor shaft 4 due to the centrifugal force and suppress the reduction of the interference due to the widening of the rotor shaft 4, and it is possible to more effectively absorb the tightening load of the rotor shaft 2.

Figure 5:
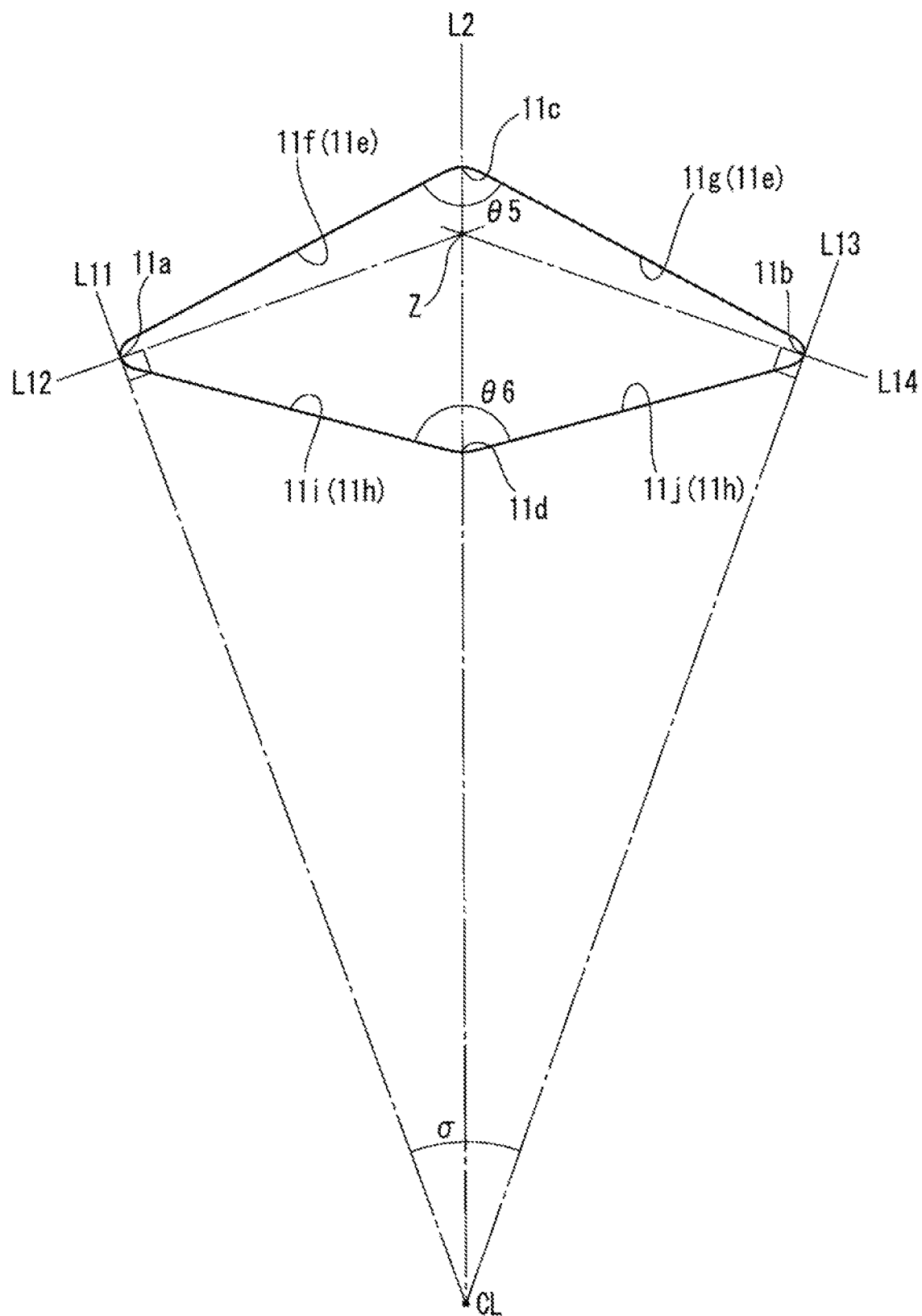
FIG. 5 is an enlarged view of a hole portion of a third hole portion group.

As illustrated in FIG. 5, the hole portion 11 of the third hole portion group 12 also has the same shape as the hole portion 8 of the second hole portion group 9.

Each hole portion 11 of the third hole portion group 12 has a substantially rectangular shape convex on both sides in the circumferential direction and both sides in the radial direction. Each hole portion 11 of the third hole portion group 12 has a first end portion 11a and a second end portion 11b forming both circumferential end portions, an outer radial side apex portion 11c which has a radial distance from the center CL of the rotor core 1 longer than that of the first end portion 11a and the second end portion 11b and forms a radially outer apex portion, and an inner radial side apex portion 11d which has a radial distance from the center CL of the rotor core 1 shorter than that of the first end portion 11a and the second end portion 11b and forms a radially inner apex portion. Therefore, the hole area of the hole portion 11 can be increased, and thus the weight reduction of the rotor core 1 can be achieved. In addition, stress concentration in the first end portion 11a and the second end portion 11b due to the centrifugal force and the tightening load of the rotor shaft 2 can be alleviated.

Further, the hole portion 11 of the third hole portion group 12 includes an outer peripheral wall 11e which has a first outer peripheral wall 11f extending substantially linearly from the first end portion 11a to the outer radial side apex portion 11c and a second outer peripheral wall 11g extending substantially linearly from the second end portion 11b to the outer radial side apex portion 11c. In addition, the hole portion 11 of the third hole portion group 12 includes an inner peripheral wall 11h which has a first inner peripheral wall 11i extending substantially linearly from the first end portion 11a to the inner radial side apex portion 11d and a second inner peripheral wall 11j extending substantially linearly from the second end portion 11b to the inner radial side apex portion 11d.

Each hole portion 11 of the third hole portion group 12 is deformed so that the outer radial side apex portion 11c is pulled radially outward with respect to the centrifugal force. By the deformation of the hole portion 11, the centrifugal force is absorbed in the hole portion 11.

Therefore, since it is possible to suppress the centrifugal force from being transmitted to the radially inner side of the rotor core 1, it is possible to suppress the widening of the rotor shaft hole 4 due to the centrifugal force and to suppress the reduction of the interference due to the widening of the rotor shaft hole 4.

Furthermore, the hole portion 11 of the third hole portion group 12 is deformed so that the inner radial side apex portion 11d is pushed radially outward with respect to the tightening load of the rotor shaft 2. By the deformation of the hole portion 11, the tightening load of the rotor shaft 2 is absorbed in the hole portion 11. Therefore, since it is possible to suppress the tightening load of the rotor shaft 2 from being transmitted to the outside in the radial direction of the rotor core 1, it is possible to suppress the deformation of the outer peripheral portion of the rotor core 1 due to the tightening load of the rotor shaft 2.

In the hole portion 11 of the second hole portion group 12, the outer radial side apex portion 11c and the inner radial side apex portion 11d are located on the virtual line L2 and has a symmetrical shape with respect to the virtual line L2.

The outer radial side apex portion 11c of the hole portion 11 of the third hole portion group 12 is located at an intersection point Z between a virtual line L12 which is orthogonal to a virtual line L11 connecting the center CL of the rotor core 1 and the first end portion 11a and passes through the first end portion 11a and a virtual line L14 which is orthogonal to a virtual line L13 connecting the center CL of the rotor core 1 and the second end portion 11b and passes through the second end portion 11b, or is located radially outward of the intersection point Z. In the embodiment, the outer radial side apex portion 11c of the hole portion 11 of the third hole portion group 12 is located radially outward of the intersection point Z.

Therefore, since the hole portion 11 of the third hole portion group 12 can reduce the bending stress generated in the first outer peripheral wall 11f and the second outer peripheral wall 11g when the centrifugal force is generated, it is possible to alleviate the stress concentration in the region around the first end portion 11a and the second end portion 11b of the outer peripheral wall 11e by the centrifugal force.

An angle θ5 formed by the first outer peripheral wall 11f and the second outer peripheral wall 11g of the hole portion 11 of the third hole portion group 12 and an angle θ6 formed by the first inner peripheral wall 11i and the second inner peripheral wall 11j of the hole portion 11 of the third hole portion group 12 satisfy the following equation (13), taking an angle formed by the first end portion 11a and the second end portion 11b at the center CL of the rotor core 1 as σ. Each of θ5 and θ6 is an angle larger than 0° and smaller than 180°. σ is an angle larger than 0° and smaller than 360°/(the number of magnet pole portions 20 of rotor core 1). In the embodiment, since the number of magnet pole portions 20 of the rotor core 1 is 12, σ is an angle larger than 0° and smaller than 30°.

$$\theta5+2\sigma \geq \theta6 \geq \theta5 \quad (13)$$

Therefore, in the hole portion 11 of the third hole portion group 12, the force acting on the inner radial side apex portion 11d by the centrifugal force is always smaller than the centrifugal force acting on the outer radial side apex portion 11c. As a result, it is possible to suppress the widening of the rotor shaft hole 4 due to the centrifugal force and to suppress the reduction of the interference due to the widening of the rotor shaft hole 4.

Further, in the hole portion 11 of the third hole portion group 12, the outer radial side apex portion 11c and the inner radial side apex portion 11d are located on the virtual line L2 and the hole portion 11 has a symmetrical shape with respect to the virtual line L2. Therefore, the hole portion 11 can suppress the widening of the rotor shaft 4 due to the centrifugal force and suppress the reduction of the interference due to the widening of the rotor shaft 4, and it is possible to more effectively absorb the tightening load of the rotor shaft 2.

Also, the plurality of hole portions 5 of the first hole portion group 6 have all the same shape, and the plurality of hole portions 8 of the second hole portion group 9 have all the same shape, and further the plurality of hole portions 11 of the third hole portion group 12 have all the same shape. Furthermore, the outer radial side apex portions 5c of the plurality of hole portions 5 of the first hole portion group 6 are arranged such that all radial distances from the center CL of the rotor core 1 are equal. The outer radial side apex portions 8c of the plurality of hole portions 8 of the second hole portion group 9 are arranged such that all radial distances from the center CL of the rotor core 1 are equal and the inner radial side apex portions 8d of the plurality of hole portions 8 of the second hole portion group 9 are arranged such that all radial distances from the center CL of the rotor core 1 are equal. The outer radial side apex portions 11c of the plurality of hole portions 11 of the third hole portion group 12 are arranged such that all radial distances from the center CL of the rotor core 1 are equal and the inner radial side apex portions 11d of the plurality of hole portions 11 of the third hole portion group 12 are arranged such that all radial distances from the center CL of the rotor core 1 are equal.

In this way, the first hole portion group 6, the second hole portion group 9, and the third hole portion group 12 can receive the centrifugal force in a well-balanced manner and it is possible to equalize the deformation in the plurality of hole portions 5 of the first hole portion group 6, the deformation in the plurality of hole portions 8 of the second hole portion group 9, and the deformation in the plurality of hole portions 11 of the third hole portion group 12.

The first end portions 8a and 11a, the second end portions 8b and 11b, the outer radial side apex portions 8c and 11c, and the inner radial side apex portions 8d and 11d of the hole portions 8 and 11 of the embodiment all have rounded corners in which the corners are rounded. However, the shapes of first end portion 8a and 11a, the second end portion 8b and 11b, the outer radial side apex portions 8c and 11c, and the inner radial side apex portions 8d and 11d can be changed as appropriate.

Figure 6:
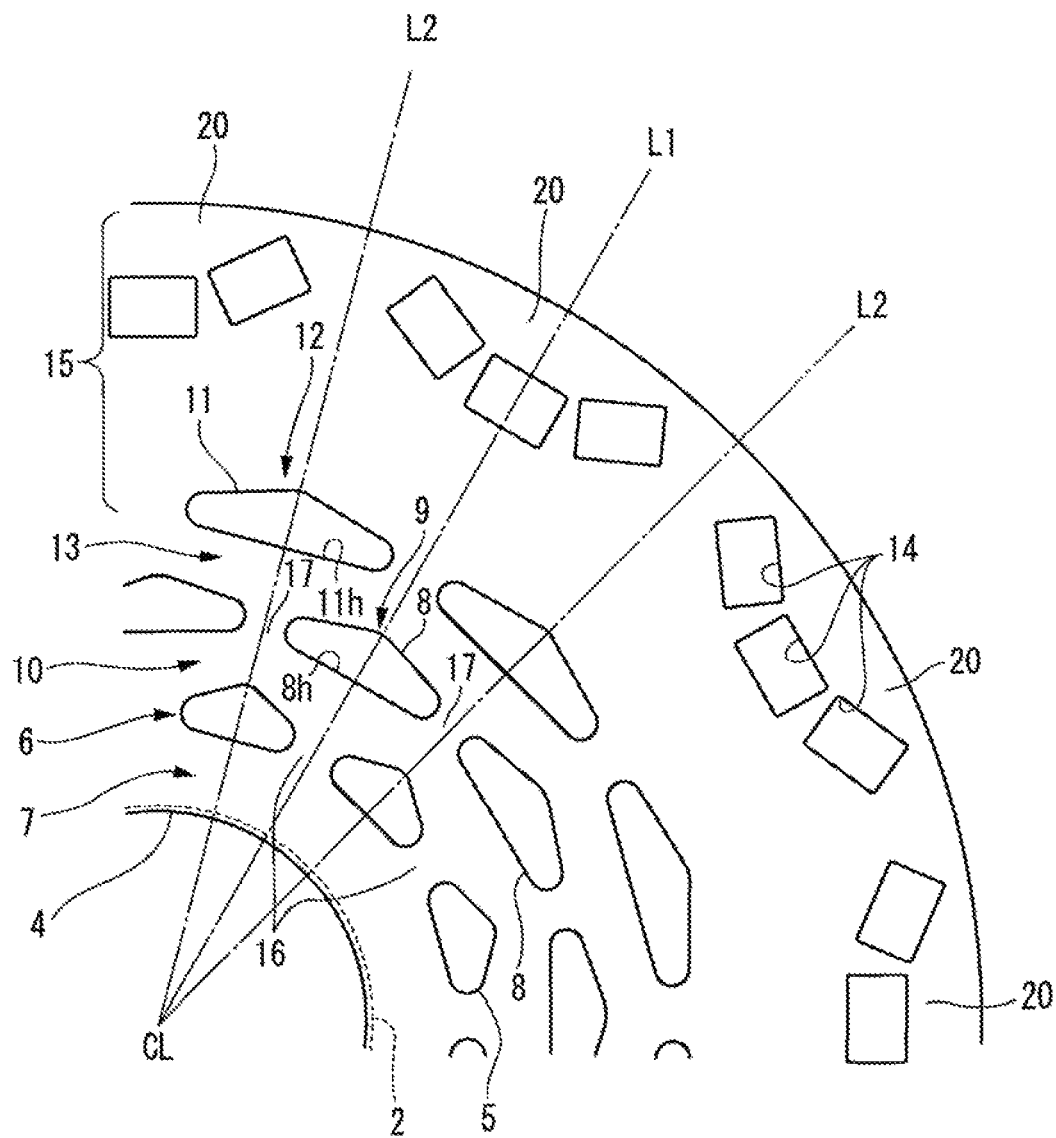
FIG. 6 is a partially enlarged view of the rotor core according to a modification example of the first embodiment.

As illustrated in FIG. 6, the hole portion 8 of the second hole portion group 9 and the hole portion 11 of the third hole portion group 12 may have a substantially triangular shape which is convex outward in the radial direction. In this case, the inner peripheral walls 8h and 11h of the hole portion 8 of the second hole portion group 9 and the hole portion 11 of the third hole portion group 12 are substantially orthogonal to the virtual line L1 and the virtual line L2, respectively, and have a substantially straight line shape extending from the first end portions 8a and 11a to the second end portions 8b and 11b, respectively. In this way, the forces acting on the inner peripheral walls 8h and 11h when the centrifugal forces act on the outer radial side apex portions 8c and 11c of the hole portion 8 and the hole portion 11 have almost no radial components in the circumferential center portions of the inner peripheral walls 8h and 11h. For this reason, it is possible to suppress the widening of the rotor shaft hole 4 due to the centrifugal force and to suppress the reduction of the interference due to the widening of the rotor shaft hole 4.

Second Embodiment

Figure 7:
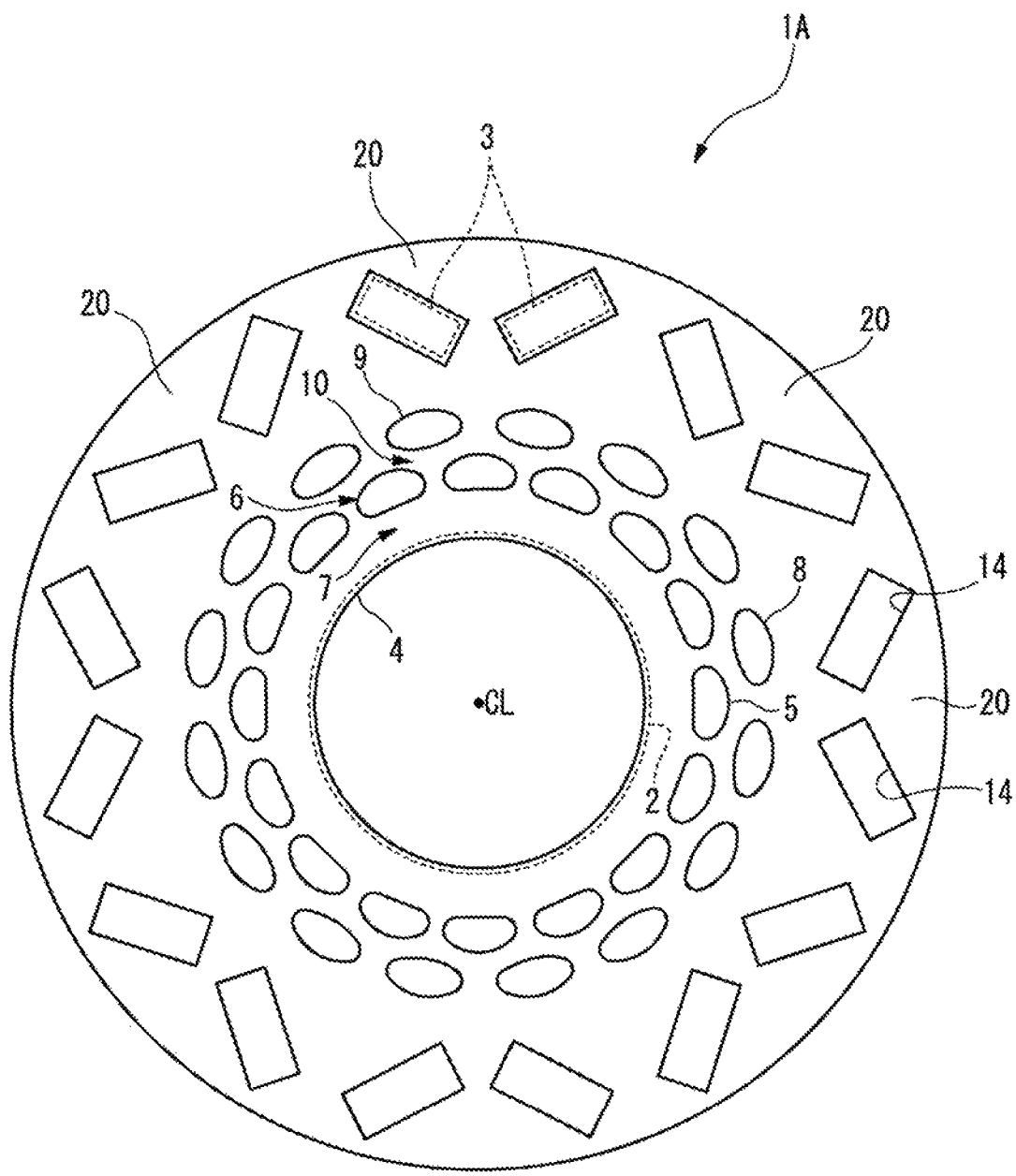
FIG. 7 is a front view of the rotor core according to a second embodiment of the invention.

Next, a rotor core 1A according to a second embodiment of the invention will be described with reference to FIG. 7. In the following description, the same constituent components as those of the rotor core 1 of the first embodiment are denoted by the same reference numerals and the descriptions thereof will be omitted or simplified. In the rotor core 1 of the first embodiment, one magnet pole portion 20 is constituted by three magnets 3 arranged in three magnet insertion holes 14 arranged in an arc shape. However, in the rotor core 1A of the second embodiment, one magnet pole portion 20 is constituted by two magnets 3 arranged in two magnet insertion holes 14 arranged in a V shape. Moreover, although the rotor core 1 of the first embodiment forms two annular portions 10 and 13 by three hole portion groups 6, 9, and 12, in the rotor core 1A of the second embodiment, one annular portion 10 is formed by two hole portion groups 6 and 9. The shapes and arrangements of the plurality of hole portions 5 of the first hole portion group 6 and the plurality of hole portions 8 of the second hole portion group 9 are the same as in the first embodiment.

Therefore, each hole portion 8 of the second hole portion group 9 is deformed so that the outer radial side apex portion 8c is pulled radially outward with respect to the centrifugal force. By the deformation of the hole portion 8, the centrifugal force is absorbed in the hole portion 8. Therefore, since it is possible to suppress the centrifugal force from being transmitted to the radially inner side of the rotor core 1, it is possible to suppress the widening of the rotor shaft hole due to the centrifugal force and to suppress the reduction of the interference due to the widening of the rotor shaft hole.

Furthermore, the hole portion 8 of the second hole portion group 9 is deformed so that the inner radial side apex portion 8d is pushed radially outward with respect to the tightening load of the rotor shaft 2. By the deformation of the hole portion 8, the tightening load of the rotor shaft 2 is absorbed by the hole portion 8. Therefore, since it is possible to suppress the tightening load of the rotor shaft 2 from being transmitted to the radially outer side of the rotor core 1, it is possible to suppress the deformation of the outer peripheral portion of the rotor core 1 due to the tightening load of the rotor shaft 2.

Further, in the hole portion 8 of the second hole portion group 9, the force acting on the inner radial side apex portion 8d by the centrifugal force is always smaller than the centrifugal force acting on the outer radial side apex portion 8c. As a result, since the reaction force of the force acting on the inner radial side apex portion 8d is always smaller than the centrifugal force, it is possible to suppress the widening of the rotor shaft hole 4 due to the centrifugal force and to suppress the reduction of the interference due to the widening of the rotor shaft hole 4.

In the embodiment described above, modifications, improvements, and the like can be made as appropriate.

At least the following matters are described in the present specification. In addition, although the constituent components corresponding to those in the embodiment described above are described in the parenthesis, it is not limited thereto.

(1) A rotor core (rotor core 1) including a rotor shaft hole (rotor shaft hole 4) into which a rotor shaft (rotor shaft 2) is tightened, a first hole portion group (first hole portion group 6) provided on an outer side of the rotor shaft hole in a radial direction and having a plurality of hole portions (hole portions 5) arranged in a circumferential direction, a shaft holding portion (shaft holding portion 7) provided between the rotor shaft hole and the first hole portion group in the radial direction, a second hole portion group (second hole portion group 9) provided on an outer side of the first hole portion group in the radial direction and having a plurality of hole portions (hole portions 8) arranged in the circumferential direction, a first annular portion (first annular portion 10) provided between the first hole portion group and the second hole portion group in the radial direction, and an electromagnetic portion (electromagnetic portion 15) provided on an outer side of the second hole portion group in the radial direction and having a plurality of magnet insertion holes (magnet insertion holes 14) into which magnets (magnets 3) are respectively inserted, wherein each hole portion of the second hole portion group is arranged to intersect with a virtual extension line (virtual line L1) of a rib (rib 16) formed between the adjacent hole portions of the first hole portion group;

each hole portion of the second hole portion group includes a first end portion (first end portion 8*a*) and a second end portion (second end portion 8*b*) forming both circumferential end portions, an outer radial side apex portion (outer radial side apex portion 8*c*) having a radial distance from a center (center CL) of the rotor core longer than that of the first end portion and the second end portion and forming a radially outer apex portion, and an outer peripheral wall (outer peripheral wall 8*e*) having a first outer peripheral wall (first outer peripheral wall 8*f*) extending from the first end portion to the outer radial side apex portion and a second outer peripheral wall (second outer peripheral wall 8*g*) extending from the second end portion to the outer radial side apex portion; and the outer radial side apex portion is located at an intersection point (intersection point Y) between a virtual line (virtual line L8) which is orthogonal to a virtual line (virtual line L7) connecting the center of the rotor core and the first end portion and passes through the first end portion and a virtual line (virtual line L10) which is orthogonal to a virtual line (virtual line L9) connecting the center of the rotor core and the second end portion and passes through the second end portion, or is located radially outward of the intersection point.

According to (1), each hole portion of the second hole portion group is arranged to intersect with the virtual line of the rib formed between the adjacent hole portions of the first hole portion group. That is, the hole portions of the first hole portion group and the hole portions of the second hole portion group are alternately arranged in the circumferential direction. Thus, the centrifugal force transmitted to the first annular portion through the rib located between the adjacent hole portions of the second hole portion group can be absorbed by the hole portions of the first hole portion group.

Further, each hole portion of the second hole portion group can reduce the bending stress generated in the first outer peripheral wall and the second outer peripheral wall when the centrifugal force is generated, stress concentration in the region around the first end portion and the second end portion of the outer peripheral wall by the centrifugal force can be alleviated.

(2) The rotor core according to (1), wherein
respective hole portions of the second hole portion group are arranged such that radial distances from the center of the rotor core of the outer radial side apex portions are equal.

According to (2), since respective hole portions of the second hole portion group are arranged such that radial distances from the center of the rotor core of the outer radial side apex portions are equal, the centrifugal force can be received by the second hole portion group in a balanced manner.

(3) The rotor core according to (1) or (2), where
respective hole portions of the second hole portion group have the same shape.

According to (3), since respective hole portions of the second hole portion group have the same shape, the centrifugal force can be received by the second hole portion group in a balanced manner.

(4) The rotor core according to any one of (1) to (3), wherein each hole portion of the second hole portion group further includes an inner radial side apex portion (inner radial side apex portion 8*d*) having a radial distance from the center of the rotor core shorter than that of the first end portion and the second end portion and forming a radially inner apex portion, and an inner peripheral wall (inner peripheral wall 8*h*) having a first inner peripheral wall (first inner peripheral wall 8*i*) extending from the first end portion to the inner radial side apex portion and a second inner peripheral wall (second inner peripheral wall 8*j*) extending from the second end portion to the inner radial side apex portion and has a substantially rectangular shape; and when an angle formed by the first outer peripheral wall and the second outer peripheral wall of the hole portion of the second hole portion group is set as θ1, and an angle formed by the first inner peripheral wall and the second inner peripheral wall is set as θ2, and further an angle formed by the first end portion and the second end portion at the center of the rotor core is set as ϕ, θ1+2ϕ≥θ2≥θ1 is satisfied.

According to (4), since each hole portion of the second hole portion group satisfies θ1+2ϕ≥θ2≥θ1, in each hole portion of the second hole portion group, the force acting on the inner radial side apex portion by the centrifugal force is always smaller than the centrifugal force acting on the outer radial side apex portion. Therefore, it is possible to suppress the widening of the rotor shaft hole due to the centrifugal force and to suppress the reduction of the interference due to the widening of the rotor shaft hole.

(5) The rotor core according to any one of (1) to (4), wherein each hole portion of the first hole portion group includes
a first end portion (first end portion 5*a*) and a second end portion (second end portion 5*b*) forming both circumferential end portions, an outer radial side apex portion (outer radial side apex portion 5*c*) having a radial distance from the center of the rotor core than longer that of the first end portion and the second end portion and forming a radially outer apex portion, and an outer peripheral wall (outer peripheral wall 5*e*) having a first outer peripheral wall (first outer peripheral wall 5*f*) extending from the first end portion to the outer radial side apex portion and a second outer peripheral wall (second outer peripheral wall 5*g*) extending from the second end portion to the outer radial side apex portion; and the outer radial side apex portion is located at an intersection point (intersection point X) between a virtual line (virtual line L4) which is orthogonal to a virtual line (virtual line L3) connecting the center of the rotor core and the first end portion and passes through the first end portion and a virtual line (virtual line L6) which is orthogonal to a virtual line (virtual line L5) connecting the center of the rotor core and the second end portion and passes through the second end portion or is located radially outward of the intersection point.

According to (5), since each hole portion of the first hole portion group can reduce the bending stress generated in the first outer peripheral wall and the second outer peripheral wall when the centrifugal force is generated, stress concentration in the region around the first end portion and the second end portion of the outer peripheral wall by the centrifugal force can be alleviated.

(6) The rotor core according to any one of (1) to (5), wherein the rotor core further includes a third hole portion group (third hole portion group 12) provided on an outer side of the second hole portion group and an inner side of the electromagnetic portion in the radial direction and having a plurality of hole portions (hole portions 11) arranged in the circumferential direction, and a second annular portion (second annular portion 13) provided between the second hole portion group and the third hole portion group in the radial direction;

each hole portion of the third hole portion group is arranged to intersect with a virtual extension line (virtual line L2) of a rib (rib 17) formed between the adjacent hole portions of the second hole portion group;

each hole portion of the third hole portion group includes a first end portion (first end portion 11a) and a second end portion (second end portion 11b) forming both circumferential end portions, an outer radial side apex portion (outer radial side apex portion 11c) having a radial distance from the center of the rotor core longer than that of the first end portion and the second end portion and forming a radially outer apex portion, and an outer peripheral wall (outer peripheral wall 11e) having a first outer peripheral wall (first outer peripheral wall 11f) extending from the first end portion to the outer radial side apex portion and a second outer peripheral wall (second outer peripheral wall 11g) extending from the second end portion to the outer radial side apex portion; and the outer radial side apex portion is located at an intersection point (intersection point Z) between a virtual line (virtual line L12) which is orthogonal to a virtual line (virtual line L11) connecting the center of the rotor core and the first end portion and passes through the first end portion and a virtual line (virtual line L14) which is orthogonal to a virtual line (virtual line L13) connecting the center of the rotor core and the second end portion and passes through the second end portion, or is located radially outward of the intersection point.

According to (6), each hole portion of the third hole portion group is arranged to intersect with the virtual line of the rib formed between the adjacent hole portions of the second hole portion group. That is, the hole portions of the second hole portion group and the hole portions of the third hole portion group are alternately arranged in the circumferential direction. Thus, the centrifugal force transmitted to the second annular portion through the rib located between the adjacent hole portions of the third hole portion group can be absorbed by the hole portions of the second hole portion group.

Further, since each hole portion of the third hole portion group can reduce the bending stress generated in the first outer peripheral wall and the second outer peripheral wall when the centrifugal force is generated, stress concentration in the region around the first end portion and the second end portion of the outer peripheral wall by the centrifugal force can be alleviated.

(7) The rotor core according to (6), wherein respective hole portions of the third hole portion group are arranged such that radial distances from the center of the rotor core of the outer radial side apex portions are equal.

According to (7), since respective hole portions of the third hole portion group are arranged such that radial distances from the center of the rotor core of the outer radial side apex portions are equal, the centrifugal force can be received by the third hole portion group in a balanced manner.

(8) The rotor core according to (6) or (7), wherein respective hole portions of the third hole portion group have the same shape.

According to (8), since respective hole portions of the third hole portion group have the same shape, the centrifugal force can be received by the third hole portion group in a balanced manner.

(9) The rotor core according to any one of (6) to (8), wherein each hole portion of the third hole portion group further includes, an inner radial side apex portion (inner radial side apex portion 11d) having a radial distance from the center of the rotor core shorter than that of the first end portion and the second end portion and forming a radially inner apex portion, and an inner peripheral wall (inner peripheral wall 11h) having a first inner peripheral wall (first inner peripheral wall 11i) extending from the first end portion to the inner radial side apex portion and a second inner peripheral wall (second inner peripheral wall 11j) extending from the second end portion to the inner radial side apex portion and has a substantially rectangular shape; and when an angle formed by the first outer peripheral wall and the second outer peripheral wall of the hole portion of the third hole portion group is set as θ5, and an angle formed by the first inner peripheral wall and the second inner peripheral wall is set as θ6, and further an angle formed by the first end portion and the second end portion at the center of the rotor core is set as σ, $\theta5+2\sigma \geq \theta6 \geq \theta5$ is satisfied.

According to (9), since each hole portion of the third hole portion group satisfies $\theta5+2\sigma \geq \theta6 \geq \theta5$, in each hole portion of the third hole portion group, the force acting on the inner radial side apex portion by the centrifugal force is always smaller than the centrifugal force acting on the outer radial side apex portion. Therefore, it is possible to suppress the widening of the rotor shaft hole due to the centrifugal force and to suppress the reduction of the interference due to the widening of the rotor shaft hole.

The invention claimed is:
1. A rotor core comprising:
a rotor shaft hole into which a rotor shaft is tightened;
a first hole portion group provided on an outer side of the rotor shaft hole in a radial direction and having a plurality of hole portions arranged in a circumferential direction;

a shaft holding portion provided between the rotor shaft hole and the first hole portion group in the radial direction;

a second hole portion group provided on an outer side of the first hole portion group in the radial direction and having a plurality of hole portions arranged in the circumferential direction;

a first annular portion provided between the first hole portion group and the second hole portion group in the radial direction; and an electromagnetic portion provided on an outer side of the second hole portion group in the radial direction and having a plurality of magnet insertion holes into which magnets are respectively inserted, wherein:

each hole portion of the second hole portion group is arranged to intersect with a virtual extension line of a rib formed between the adjacent hole portions of the first hole portion group, each hole portion of the second hole portion group includes:
  a first end portion and a second end portion forming both circumferential end portions;
  an outer radial side apex portion having a radial distance from a center of the rotor core longer than that of the first end portion and the second end portion and forming a radially outer apex portion; and
  an outer peripheral wall having a first outer peripheral wall extending from the first end portion to the outer radial side apex portion and a second outer peripheral wall extending from the second end portion to the outer radial side apex portion, the outer radial side apex portion is located at an intersection point between a virtual line which is orthogonal to a virtual line connecting the center of the rotor core and the first end portion and passes through the first end portion and a virtual line which is orthogonal to a virtual line connecting the center of the rotor core and the second end portion and passes through the second end portion or is located radially outward of the intersection point, a radially inner end portion of each hole portion of the second hole portion group is positioned radially outward of a radially outer end portion of each hole portion of the first hole portion group, each hole portion of the second hole portion group further includes:
  an inner radial side apex portion having a radial distance from the center of the rotor core shorter than that of the first end portion and the second end portion and forming a radially inner apex portion; and
  an inner peripheral wall having a first inner peripheral wall extending from the first end portion to the inner radial side apex portion and a second inner peripheral wall extending from the second end portion to the inner radial side apex portion, each hole portion of the second hole portion group has a substantially rectangular shape, and when an angle formed by the first outer peripheral wall and the second outer peripheral wall of the hole portion of the second hole portion group is set as $\theta 1$, and an angle formed by the first inner peripheral wall and the second inner peripheral wall is set as $\theta 2$, and further an angle formed by the first end portion and the second end portion at the center of the rotor core is set as $\phi$, $\theta 1 + 2\phi \geq \theta 2 \geq \theta 1$ is satisfied.

2. The rotor core according to claim 1, wherein respective hole portions of the second hole portion group are arranged such that radial distances from the center of the rotor core of the outer radial side apex portions are equal.

3. The rotor core according to claim 1, wherein respective hole portions of the second hole portion group have the same shape.

4. The rotor core according to claim 1, wherein:
each hole portion of the first hole portion group includes:
  a first end portion and a second end portion forming both circumferential end portions;
  an outer radial side apex portion having a radial distance from the center of the rotor core longer than that of the first end portion and the second end portion and forming a radially outer apex portion; and
  an outer peripheral wall having a first outer peripheral wall extending from the first end portion to the outer radial side apex portion and a second outer peripheral wall extending from the second end portion to the outer radial side apex portion; and the outer radial side apex portion is located at an intersection point between a virtual line which is orthogonal to a virtual line connecting the center of the rotor core and the first end portion and passes through the first end portion and a virtual line which is orthogonal to a virtual line connecting the center of the rotor core and the second end portion and passes through the second end portion or is located radially outward of the intersection point.

5. The rotor core according to claim 1, wherein:
the rotor core further includes:
  a third hole portion group provided on an outer side of the second hole portion group and an inner side of the electromagnetic portion in the radial direction and having a plurality of hole portions arranged in the circumferential direction; and
  a second annular portion provided between the second hole portion group and the third hole portion group in the radial direction;

each hole portion of the third hole portion group is arranged to intersect with a virtual extension line of a rib formed between the adjacent hole portions of the second hole portion group;

each hole portion of the third hole portion group includes:
  a first end portion and a second end portion forming both circumferential end portions;
  an outer radial side apex portion having a radial distance from the center of the rotor core longer than that of the first end portion and the second end portion and forming a radially outer apex portion; and
  an outer peripheral wall having a first outer peripheral wall extending from the first end portion to the outer radial side apex portion and a second outer peripheral wall extending from the second end portion to the outer radial side apex portion; and the outer radial side apex portion is located at an intersection point between a virtual line which is orthogonal to a virtual line connecting the center of the rotor core and the first end portion and passes through the first end portion and a virtual line which is orthogonal to a virtual line connecting the center of the rotor core and the second end portion and passes through the second end portion or is located radially outward of the intersection point.

6. The rotor core according to claim 5, wherein respective hole portions of the third hole portion group are arranged such that radial distances from the center of the rotor core of the outer radial side apex portions are equal.

7. The rotor core according to claim 5, wherein respective hole portions of the third hole portion group have the same shape.

8. The rotor core according to claim 5, wherein:
each hole portion of the third hole portion group further includes:
- an inner radial side apex portion having a radial distance from the center of the rotor core shorter than that of the first end portion and the second end portion and forming a radially inner apex portion; and
- an inner peripheral wall having a first inner peripheral wall extending from the first end portion to the inner radial side apex portion and a second inner peripheral wall extending from the second end portion to the inner radial side apex portion and has a substantially rectangular shape; and when an angle formed by the first outer peripheral wall and the second outer peripheral wall of the hole portion of the third hole portion group is set as θ5, and an angle formed by the first inner peripheral wall and the second inner peripheral wall is set as θ6, and further an angle formed by the first end portion and the second end portion at the center of the rotor core is set as σ, θ5+2σ≥θ6≥θ5 is satisfied.

* * * * *